US011356855B2

(12) United States Patent
MacMullan et al.

(10) Patent No.: US 11,356,855 B2
(45) Date of Patent: Jun. 7, 2022

(54) SPECTRUM ACCESS OPTIMIZATION FOR SELF ORGANIZING NETWORKS

(71) Applicant: Federated Wireless, Inc., Arlington, VA (US)

(72) Inventors: Samuel Jay MacMullan, Carlisle, MA (US); Deepak Das, Lexington, MA (US); Osama Tarraf, Falls Church, VA (US); Pirouz Zarrinkhat, Mountain View, CA (US)

(73) Assignee: Federated Wireless, Inc., Arlington, VA (US)

( * ) Notice: Subject to any disclaimer, the term of this patent is extended or adjusted under 35 U.S.C. 154(b) by 27 days.

(21) Appl. No.: 16/056,093

(22) Filed: Aug. 6, 2018

(65) Prior Publication Data

US 2018/0376342 A1 Dec. 27, 2018

Related U.S. Application Data

(62) Division of application No. 15/481,243, filed on Apr. 6, 2017.

(60) Provisional application No. 62/331,810, filed on May 4, 2016, provisional application No. 62/319,665, filed on Apr. 7, 2016.

(51) Int. Cl.
*H04W 16/14* (2009.01)
*H04W 24/02* (2009.01)
*H04L 5/14* (2006.01)
*H04W 88/08* (2009.01)

(52) U.S. Cl.
CPC .......... *H04W 16/14* (2013.01); *H04W 24/02* (2013.01); *H04L 5/1438* (2013.01); *H04W 88/08* (2013.01)

(58) Field of Classification Search
CPC .......... H04W 72/0446; H04W 72/082; H04W 88/06; H04W 16/14
See application file for complete search history.

(56) References Cited

U.S. PATENT DOCUMENTS

| | | | | |
|---|---|---|---|---|
| 2012/0178386 | A1* | 7/2012 | Pascolini | H04B 1/525 455/84 |
| 2015/0078220 | A1* | 3/2015 | Hu | H04W 24/08 370/280 |
| 2015/0162966 | A1* | 6/2015 | Kim | H04L 5/0048 370/252 |

* cited by examiner

*Primary Examiner* — Joshua L Schwartz
(74) *Attorney, Agent, or Firm* — Finnegan, Henderson, Farabow, Garrett & Dunner LLP

(57) ABSTRACT

Improved techniques are provided for managing and optimizing network resources and spectrum access in a Self-Organizing Network (SON). A Spectrum Access System (SAS) collects network-related information from a plurality of network sources, such as base stations and user equipments (UEs), to perform optimization and organization across different networks, network operators, and network technologies. In some embodiments, the SAS may use the network information and a Radio Environment Map to optimize TDD synchronization in the SON. In other embodiments, the SAS may use the network information to populate a global Neighbor Relation Table. The SAS also may use the network information to optimize one or more network parameters, such as Physical Cell Identities or Root Sequence Indexes, antenna parameters, transmit power levels, handover thresholds, channel assignments, and so on, for use in the SON. Advantageously, the SAS's optimized network parameters may be used to improve network performance, reduce signal interference, and adjust to network failures in the SON.

5 Claims, 13 Drawing Sheets

SPECTRUM ACCESS OPTIMIZATION FOR SELF ORGANIZING NETWORKS

CROSS-REFERENCE TO RELATED PATENT APPLICATIONS

This application is a divisional of U.S. application Ser. No. 15/481,243, filed Apr. 6, 2017, which claims the benefit of U.S. Provisional Application No. 62/319,665, filed Apr. 7, 2016, and U.S. Provisional Application No. 62/331,810, filed May 4, 2016. The contents of each of the above-referenced applications are hereby incorporated by reference in their entireties.

FIELD OF INVENTION

The present invention relates to techniques for shared spectrum access in wireless networks and, more particularly, to methods, systems, and apparatuses for optimizing shared spectrum access in such networks.

BACKGROUND

Radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party gets one or more frequency assignments, in the form of a license, to operate a radio transmitter on specific frequencies within a particular geographic location.

The system of spectrum allocation, allotment, and assignment is failing to keep pace with the increasing demand for spectrum. There is therefore a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned to licensed users.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to unlicensed spectrum, such as TV Whitespace. Coordinating and managing multi-user access to a shared spectrum present challenges in a DSA system.

There has been research and development of computer-automated techniques for the optimization and organization of spectrum allocation in standalone wireless networks, e.g., Self-Organizing Network (SON) techniques in $3^{rd}$ Generation Partnership Project (3GPP) networks. A SON may comprise one or more interconnected standalone networks, e.g., sharing access to at least one SAS. These standalone networks typically use a single radio access technology, such as described in the 3GPP standards for Long Term Evolution (LTE). Further, these networks are usually managed by a single operator, e.g., Verizon or AT&T, which has an exclusive license to use a portion of spectrum in a geographical area.

As wireless demands grow, shared spectrum usage is becoming more common, e.g., in Television Whitespace (TVWS) bands and in the 3.5 GHz Federal band. In these environments, a SAS may control spectrum access among users assigned to different priority levels (or "tiers") of spectrum-access privileges. The SAS may implement spectrum management policies for users in each tier. For example, the SAS may be configured to protect spectrum usage by higher-priority "primary users" in shared bands from harmful interference that would result from communications by lower-priority "secondary users." As used herein, a "user" may refer to a user equipment (such as a mobile phone) or a person using a user equipment as will be apparent in context. In many cases where there are relatively few primary users, spectrum usage by primary users is low, so secondary users can dominate overall resource usage. Nonetheless, in regions with primary users, the SAS should ensure that any spectrum allocations to secondary users will not create unacceptable levels of interference with the primary users.

To assist the SAS with spectrum management, base stations serving secondary users are often required by regulation (e.g., FCC requirements) to share their operating parameters (e.g., location, antenna characteristics, desired operating power, air interface technology, requested data rates) and measurements (e.g., neighboring base station interference, overall interference, bit/block/frame error rates, latencies, buffer status) with the SAS. Secondary users may also opt to share operating parameters and measurements with the SAS, since such sharing may result in improved secondary user performance.

The SAS may employ a Radio Environment Map (REM) to manage spectrum access in one or more wireless networks. The REM describes the propagation environment between each pair of devices (e.g., base stations or mobile users) in the overall shared spectrum system. A REM can be as simple as a table of location, time, and energy detected. It may include items such as, but not limited to, location, time, day, strength of signal, whether users are mobile and when they are roaming, travel directions, and so on. This information can be combined with geographic data such as terrain, tree cover, season of the year, elevation, potential tall buildings, and many other possible relevant items that can affect radio signals. The REM may be used to track historical and geo-located spectrum data. For example, the REM may reflect that every day at 5 PM at a major office park, cell phone usage peaks as people leave from work to head home. However, at 6 PM, there may be little cell phone usage.

The SAS can create an accurate and high-resolution REM because it can leverage powerful and distributed processing (e.g., cloud-based processing instances) and large databases (e.g., building data, floor plans, clutter models, terrain models, base station and mobile user models) for propagation and interference modeling, and may apply machine learning based on measurements to refine these models. The SAS can use its REM to create a global and precise view of the shared spectrum environment.

It is desirable that the SAS manages multi-user spectrum access in a manner that minimizes signal interference between the users, base stations, and other devices communicating in the network. Undesired interference may result when multiple devices transmit at the same time, for example, in a Time Division Duplex (TDD) system. TDD operation is proposed for many shared spectrum applications given the need for secondary-user uplink and downlink operation in a single frequency range. TDD operation generally involves the use of fixed-duration frames which include uplink and downlink time slots. For example, time division LTE (TD-LTE) uses 5 ms or 10 ms frames containing ten subframes (each with two time slots) that can be designated for uplink or downlink use. The uplink subframes are used for mobile users to communicate with the base station, whereas the downlink subframes are used by the base station to communicate with the mobile users. Other TDD systems may employ different frame structures, e.g., containing different configurations of subframes and/or time slots. As used herein, a "subframe" may contain one or more time slots and is not limited to any particular implementation.

A significant concern with TDD operation is interference caused by unsynchronized base-station transmissions from other operators. A base station's transmission power is typically much larger than the transmission power of the mobile users. As a result, in an uplink transmission from a mobile user to a target base station, interference from another base station's transmissions can dwarf the mobile user's signal at the target base station's receiver. Such interference can be caused by base stations operating on the same frequency channels or on channels that are not sufficiently separated in frequency (e.g., base stations operating in adjacent frequency channels 101 and 102 as shown in FIG. 1).

Single operator networks typically resolve this issue by having synchronized TDD networks where each base station transmits in the same time slots. FIG. 2 illustrates frames 201A and 201B for communicating with base stations 202A and 202B, respectively, with synchronized uplink ("U") and downlink ("D") subframes 203, including special ("S") subframes that provide a guard interval between transitions from D to U subframes. The synchronized uplink subframes are reserved for mobile-user transmissions. Therefore, during an uplink subframe, a base station will only receive signals from mobile users, avoiding interference from other base stations. This avoids the severe interference that would result if the base stations were uncoordinated, e.g., if some base stations were transmitting while others were receiving.

Synchronization is complicated because some networks desire a larger portion of the TDD frame reserved for downlink transmissions. For example, some networks may predominantly support mobile users desiring downlink video streaming. In contrast, other networks may support symmetric uplink traffic and downlink traffic, e.g., voice networks. Air interfaces such as WiMAX and LTE provide predetermined TDD frame configurations, with known distributions of uplink and downlink subframes and/or time slots, and allow the network (e.g., via static or dynamic configurations) to select a known TDD configuration with a given frame structure to accommodate expected traffic load for each network.

Further complicating TDD network synchronization is that some base stations may lack the ability to determine accurate timing. Frame timing is typically achieved using GPS, Precision Time Protocol (PTP), or network-listen capabilities at the base station. However, some base stations may lack such timing capability and, hence, these base stations cannot align the beginning of their TDD frames with other base stations.

In scenarios with multiple networks, operators, and/or air interfaces, it is difficult to provide TDD network synchronization in shared frequency channels. Shared channel networks may lack interfaces between them, making it difficult for them to share the network parameters and measurements necessary for TDD network synchronization. In addition, networks employing different radio interface technologies (e.g., WiMAX, LTE) may not have TDD frame sizes and configurations that can be aligned without significant uplink/downlink conflicts. Other shared-channel base stations may not have accurate timing capability.

SUMMARY

The present invention provides improved techniques for managing and optimizing network resources and spectrum access in SONs containing one or more wireless networks. In the disclosed embodiments, an SAS collects network-related information from a plurality of network sources, such as base stations and user equipments in one or more networks and secondary networks, to perform optimization and organization across different networks, network operators, and network technologies. The network information may include, but is not limited to, measurements relating to signal strength, quality, or interference, TDD configuration information, Random Access Channel (RACH) reports, network capabilities, network topology information, network traffic or loading information, radio link failure (RLF) information, network testing information (such as Minimization of Driving Test (MDT) measurements), or other network information provided to the SAS from base stations and mobile users.

In some disclosed embodiments, the SAS uses the network information to optimize TDD synchronization for communications between user equipments and base stations in the SON, e.g., to reduce signal interference in the network. In some embodiments, the SAS uses the network information to create (or update) a global Neighbor Relation Table (NRT) that identifies a base station's neighbor relations (e.g., information about other base stations) outside of the base station's local network. The SAS may provide the global NRT to the base station to facilitate cross-network handovers between the base station and base stations in other networks.

Further, in some disclosed embodiments the SAS may use the network information to optimize one or more network parameters, such as Physical Cell Identities (PCI) or Root Sequence Indexes (RSI), assigned to base stations in the SON, or other parameters, such as RACH parameters, antenna parameters (such as antenna azimuth and tilt), transmit power levels, inter-frequency handover thresholds, channel assignments, and so on, assigned to base stations or user equipment. Advantageously, the SAS's optimized network parameters may be used to improve network performance, reduce signal interference, and adjust to network failures in the SON. The SAS may employ cloud-based processing that further enables the SAS to rapidly and cost-effectively perform such centralized organization and optimization functions.

In other embodiments, the SAS may use a REM to enhance its ability to optimize and organize spectrum and resource usage in the SON. The SAS may maintain a global REM to keep track of the network information across different networks, operators, and vendors. In some embodiments, the SAS inputs at least some of the network information in the REM to an objective function, from which the SAS may determine assignments of secondary-user channels and transmit power levels. The objective function may account for at least one of secondary-user interference, secondary-user bandwidth, secondary-user geographic coverage, secondary-user TDD frame configurations, cost of switching between frequency channels, cost of secondary users with different radio technologies operating on the same channel (co-channel) or on adjacent channels, cost of misaligned TDD configurations, or any other network information stored in or derived from information in the global REM. In this context, each cost may be represented by one or more values indicative of a relative or absolute cost associated with a network configuration.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF DISCLOSED EMBODIMENTS

Figure 1:
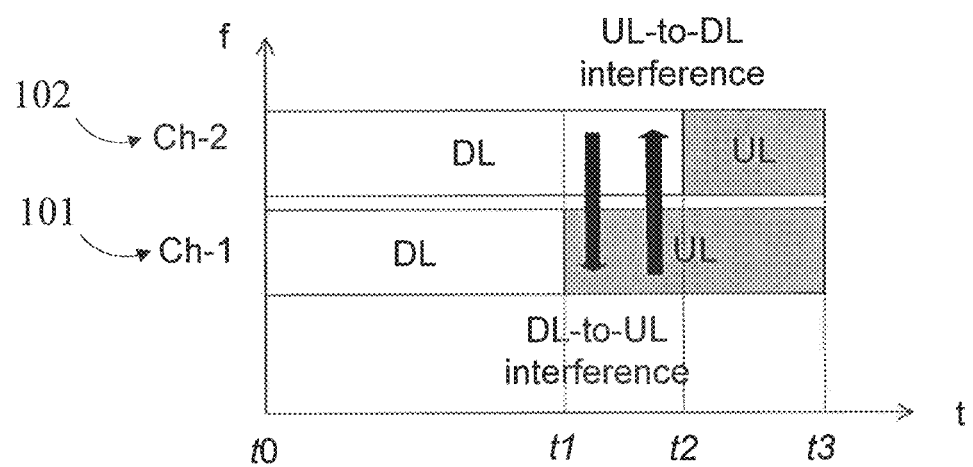
FIG. 1 is a schematic diagram illustrating exemplary signal interference between uplink and downlink channels used for communicating in a network.
Figure 2:
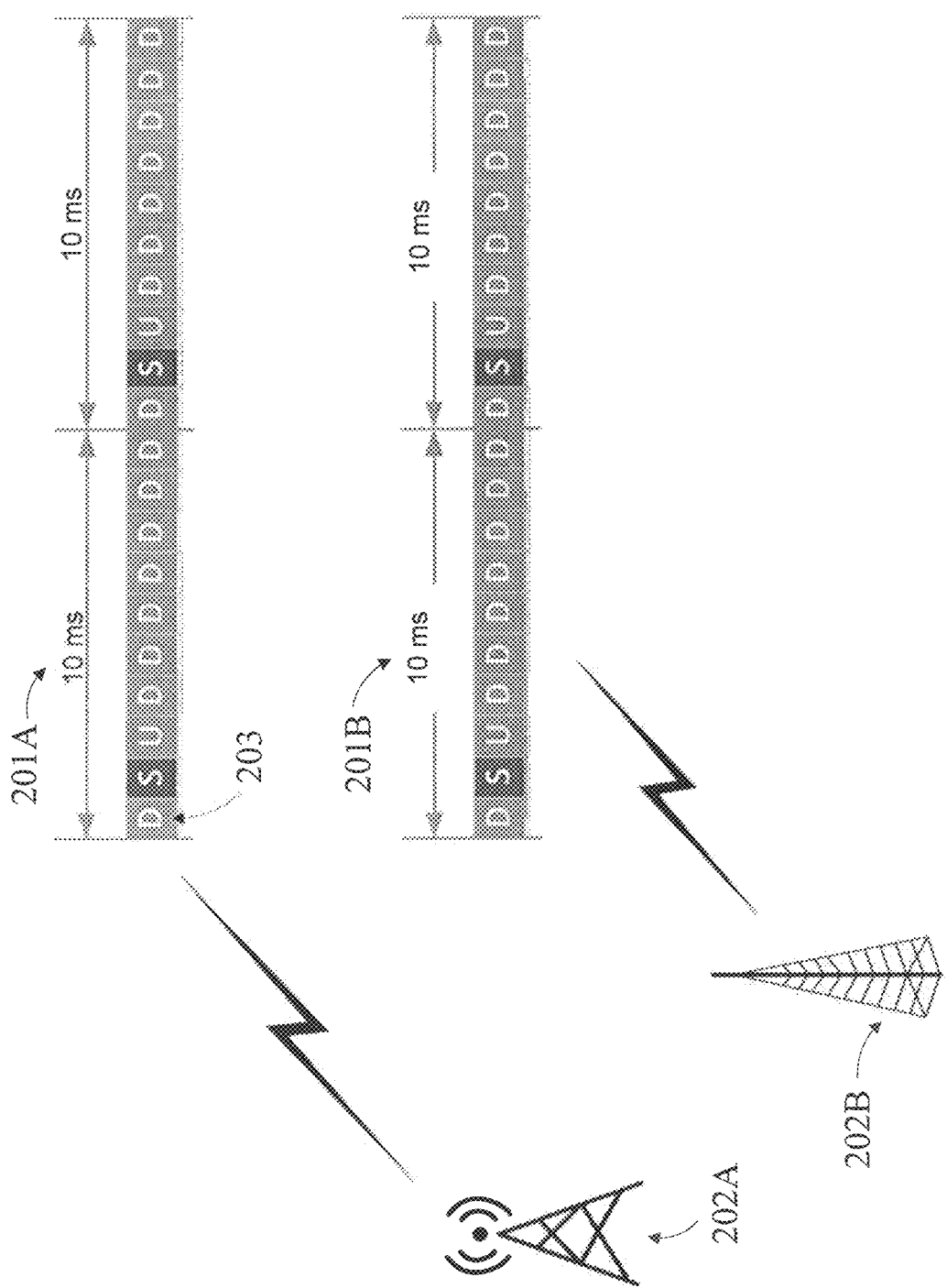
FIG. 2 is a schematic diagram of an exemplary TDD frame structure that may be used for communications between base stations and user equipment in a network.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Figure 3:
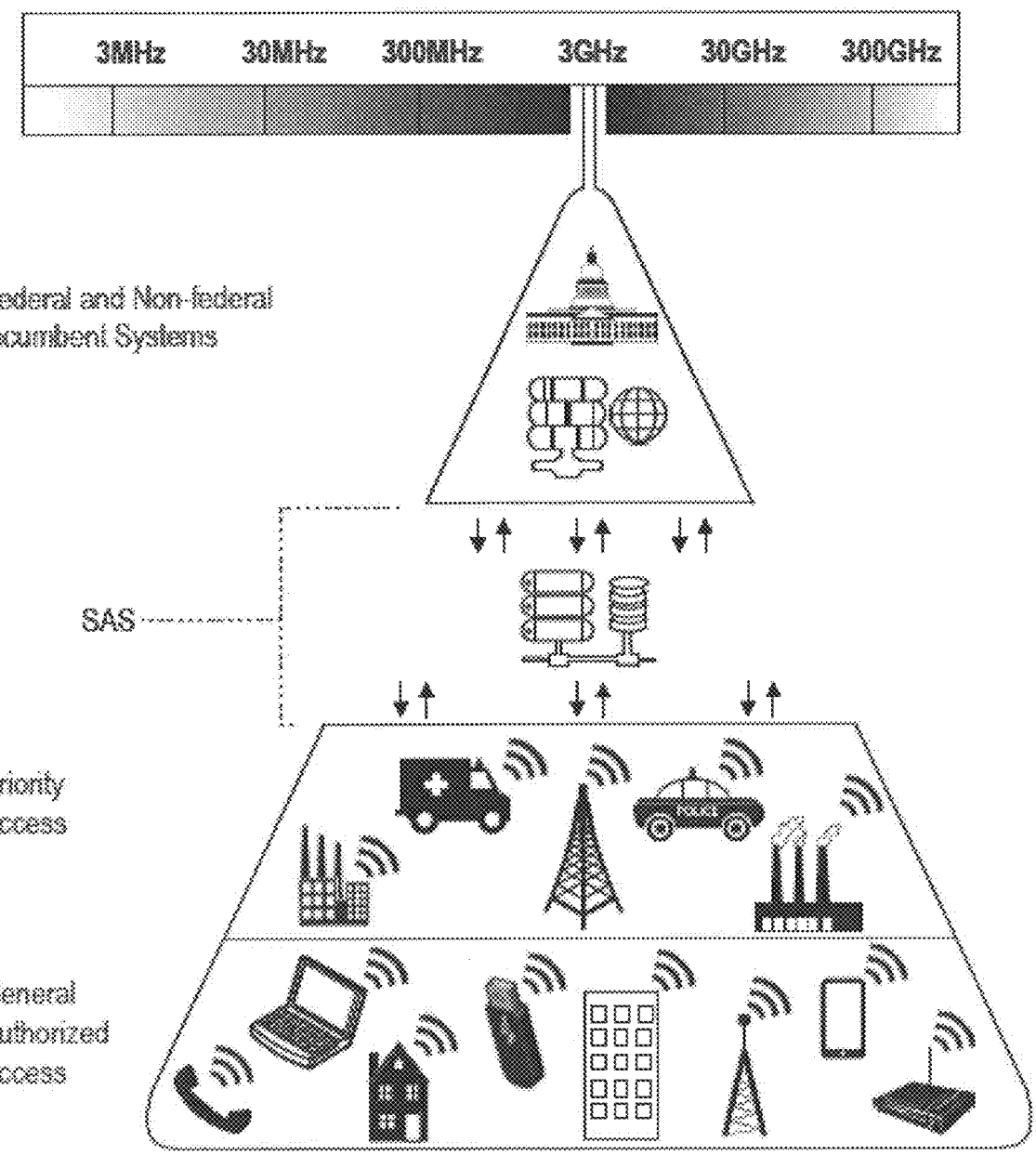
FIG. 3 is a schematic diagram of a three-tiered organization for the 3.5 GHz federal band including a Spectrum Access System, Incumbent Systems, Priority Access License Systems, and General Authorized Access Systems that may be used in accordance with the disclosed embodiments.

LTE has been widely deployed in the U.S. In a shared-spectrum system, such as the three-tiered model adopted by FCC for the 3.5 GHz band as shown in FIG. 3, an SAS may be used to manage spectrum access by Incumbent Systems (also described as primary systems), such as military or federal government users, who previously have had accessed the 3.5 GHz spectrum, and also Priority Access License (PAL) and General Authorized Access (GAA) users who are permitted to share access to the same spectrum in accordance with FCC regulations. In many cases, such shared-spectrum systems will likely implement LTE as their wireless communication standard, and their LTE systems will coexist with non-LTE systems. Descriptions of the disclosed embodiments are provided below using the example of an LTE system and the three-tiered model adopted by the FCC, but those skilled in the art will readily appreciate that the invention is more generally applicable and not limited to the exemplary systems and standards disclosed herein.

Figure 4:
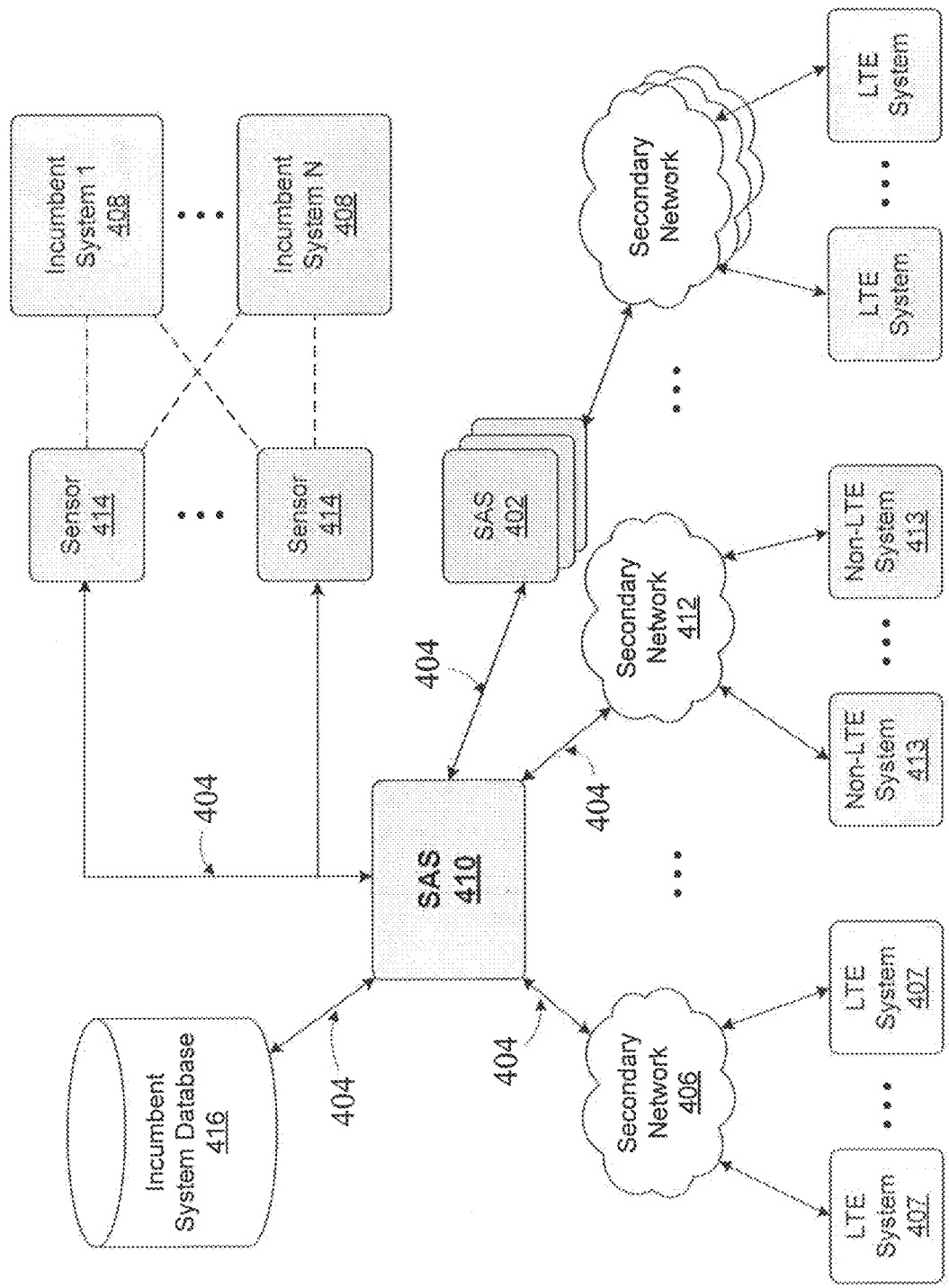
FIG. 4 is a schematic block diagram of an exemplary network configuration including a Spectrum Access System, Incumbent Systems, Priority Access License Systems, and General Authorized Access Systems that may be used in accordance with the disclosed embodiments.

FIG. 4 illustrates an exemplary shared-spectrum system 400 consistent with the disclosed embodiments. System 400 includes a SAS 410 to which all devices of the system connect, one or more LTE networks 406 and their associated LTE systems 407, non-LTE incumbent systems ("incumbents") 408, one or more SASs 402, and/or other non-LTE, non-incumbent networks 412 and their associated systems 413. SAS 410 communicates via network 404, which may comprise any suitable private or public network, such as the internet, a wide area network, a local area network, an enterprise network, a virtual private network, or any other type of network that permits exchange of information between various components of the system. Network 404 may be implemented as one or more interconnected networks through which one or more LTE secondary networks 406 and non-LTE secondary networks 412 may communicate.

LTE secondary network 406 may comprise, for example, a cellular network, base stations (eNodeB), user equipment (UE), emergency vehicles, or any other system 407 that does not have incumbent or primary status. In the three-tiered model shown in FIG. 3, LTE secondary network 406 may provide network access to PAL and/or GAA users. In the example of the 3.5 GHz band, non-LTE incumbents 408 may comprise systems used by branches of armed forces, for example, U.S. Department of Defense air surveillance radar systems, or devices used by other government operators. Non-LTE, non-incumbent secondary network 412 may comprise, for example, Wi-Fi networks or other telecommunication networks using Wideband Code Division Multiple Access (WCDMA), Global System for Mobile Communication (GSM), or any other suitable technology.

SAS 410 coordinates and manages spectrum sharing among non-LTE incumbents 408, LTE systems 407 associated with secondary network 406, other SASs 410, and non-LTE, non-incumbent systems 413 associated with secondary network 412, for example, by assigning spectrum to an LTE system 407 under secondary network 406 as requested, while at the same time ensuring that the LTE system and non-LTE, non-incumbent systems 413 under secondary network 412, and other communication systems managed by one or more SASs 402 do not interfere with the non-LTE incumbents 408. One or more sensors 414 may be used to monitor which frequency channels are in use by users of the incumbent systems 408 and report any detected spectrum usage to the SAS 410. Alternatively, at least one Incumbent System Database 416 may be used to determine the presence and parameters of some incumbent systems 408. One or more SASs 402 may facilitate spectrum sharing by notifying LTE systems associated with at least one secondary network 406 and non-LTE, non-incumbent systems associated with at least one secondary network 412 regarding which frequencies they may operate on, when they should vacate certain frequencies, or at which power level(s) they may transmit.

SAS 410 and the various network elements, such as base stations and user equipment, and LTE systems 407 under secondary network 406, incumbent non-LTE systems 408, and non-LTE, non-incumbent systems 413 under secondary network 412, each may include necessary components to facilitate wireless communication among them. Such components may include antennas (or antenna arrays), transmitters, receivers, and/or transceivers. They may also include one or more processors for processing and generating signals and memory for storing data and instructions for execution by the processors.

Figure 5:
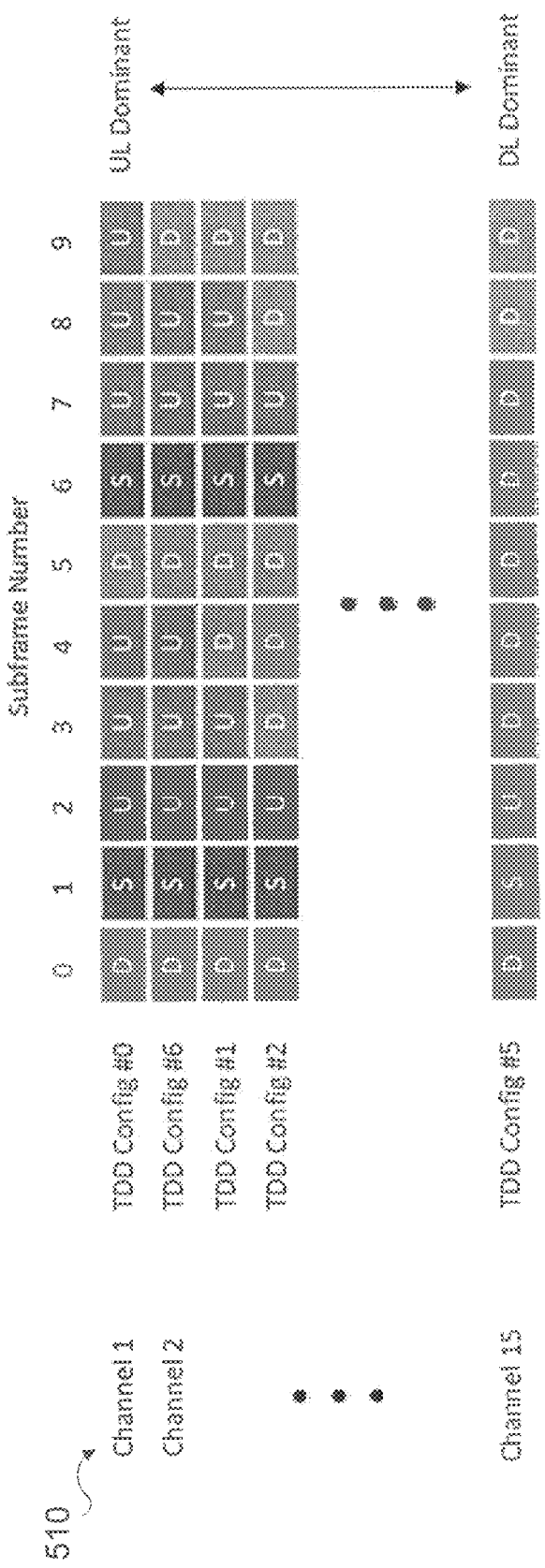
FIG. 5 is a schematic diagram of exemplary TDD Configurations that may be used for communicating between base stations and user equipment in accordance with at least some of the disclosed embodiments.

LTE standards provide for uplink and downlink communications using different frequency bands in a scheme referred to as frequency division duplexing (FDD), and also provide for use of the same frequency band on both the uplink and downlink but at alternating times, which is referred to as time division duplexing or time-division LTE (TD-LTE). For TD-LTE, the standards provide predetermined TDD configurations defining which subframes are used for uplink and downlink communications. FIG. 5 illustrates several exemplary TDD configurations, e.g., with respective TDD Configuration identifiers, that may be assigned to an LTE frame. Some of the exemplary TDD configurations have more subframes allocated for uplink communications ("UL Dominant") and others have more for downlink ("DL Dominant"). As shown in FIG. 5, frequency channels 510 may be configured to use different TDD configurations.

Given its central position in the shared spectrum environment and processing capabilities, the SAS 410 is well positioned to perform TDD synchronization across different networks, operators, and air interfaces. The SAS can create a Radio Environment Map based on, for example, base-station and mobile-user measurements, base-station and mobile-user parameters, SAS-internal propagation and aggregate interference modeling, information accessed from one or more databases, and information obtained from spectrum sensing. The REM, expected uplink/downlink traffic load, and timing capabilities can be used to group networks on a particular TDD configuration. Base stations that are adequately geographically separated can operate on the same frequency channel (co-channel) or on closely spaced channels with different TDD configurations because base station-to-base station interference is low. The SAS can determine, e.g., using the REM, the geometric distance needed between networks (or groups of base stations) using different TDD configurations such that these networks do not significantly interfere with one another.

Further, the SAS 410 can segregate base stations with poor timing capabilities onto frequencies that are not shared with base stations capable of accurate timing estimation. In such exemplary embodiments, the base stations with poor timing will not degrade the performance of base stations whose TDD frames can be aligned and synchronized.

In addition, the SAS can leverage its knowledge of the radio technology used by each network to best choose a TDD configuration for each network that reduces or minimizes base station-to-base station interference. For example, networks configured for WiMAX and TD-LTE networks can be synchronized by choosing similar TDD configurations in each of these networks. TD-LTE Frame Configuration 1 (TDD Config. #1 in FIG. 5) has similar transmission periods to the WiMAX frame structure corresponding to a DL:UL ratio of 29:18. TD-LTE Frame Configuration 2 (TDD Config. #2) has downlink/uplink transmission periods that are similar to the 35:12 WiMAX frame structure.

The TDD configuration groupings also may be chosen such that networks with very different traffic loading can use frequency channels 510 that are sufficiently separated in frequency to minimize interference. For example, with reference to FIGS. 4 and 5, SAS 410 may assign base stations that use UL-Dominant Channel 1 and DL-Dominant Channel 15 to non-adjacent frequency bands, preferably sufficiently separated in frequency to avoid or reduce interference. Groups of base stations with only small differences between their uplink/downlink traffic loading can use TDD configurations with only a small number of mismatched uplink/downlink subframes or time slots, e.g., less than (or equal to) a predetermined threshold. For example, with TD-LTE, groupings using TDD Configuration #0 should operate far away in frequency from groupings that use TDD Configuration #5 (FIG. 5), as more than half of the subframes in these TDD frame structures are mismatched. In contrast, groupings using TDD Configuration #1 can operate in frequency close to groupings that use TDD Configuration #6 since they only mismatch in Subframe Number 4.

The SAS 410 not only may compare different TDD configurations to identify the number of mismatched subframes or time slots between them (e.g., one mismatched subframe between TDD Configurations #1 and #6), but also may compare frame structures of different types of networks (e.g., LTE and WiMAX) to identify the number of mismatched subframes or time slots between their frame structures. The SAS may compare the identified number of mismatched subframes or time slots with a predetermined threshold value, e.g., two, three, or four, to determine whether the TDD configurations or frame structures are sufficiently similar to be used on the same frequency channel or on closely-spaced frequency channels in network 404 or in any secondary network 406 or 412. The SAS may make this determination, for example, based on whether the number of mismatched subframes or time slots is less than (or equal to) the predetermined threshold value.

The SAS's knowledge regarding the aggregate interference affecting primary users may be used to enhance the TDD synchronization. For example, in areas where some channels are not available for secondary use, the TDD configurations of these channels can be considered in the selection of the TDD configurations and channel assignments for the available secondary-user channels to allow better performance by separating any conflicting TDD configurations. In addition, the SAS's knowledge about the interference caused by primary users upon the lower-tier base stations may be considered as well in selecting the TDD configuration.

In operation, the SAS may group networks (and base stations in those networks) according to TDD configurations based on its Radio Environment Map, expected uplink/downlink traffic demand, timing capability, and air interface technology. Then, the SAS may separate the different groupings in frequency in relation to the uplink/downlink frame mismatches in their TDD configurations, e.g., more mismatches result in a greater frequency separation. In this manner, the SAS may use TDD configuration groupings to minimize or reduce the overall interference in the SON.

In some disclosed embodiments, SAS 410 may provide network topology information to base stations, user equipment, and/or other systems 406, 408, and 412 to facilitate handovers between base stations in one or more of network 404 and secondary networks 406 and 412. In LTE and other wireless networks, each base station maintains a list of neighboring base stations in a Neighbor Relation Table (NRT). The NRT also may include a set of parameters for the base station, such as the base station's Physical Cell Identity (PCI), Evolved Cell Global Identifier (ECGI), Tracking Area Code (TAC), and Public Land Mobile Network (PLMN) ID(s). The NRT is used by the base station to ensure smooth mobile-user handovers between base stations and minimize dropped calls and data loss.

The base station's NRT may be created from one or more base-station measurements (e.g., network-listen operations performed by the base station), information exchanged between base stations, and mobile-user reports sent to the base station. In single-network, static environments, NRTs can be generated using a large number of base-station measurements and mobile-user reports from locations covering most of the base station's network coverage area and over a relatively long time duration. However, in shared spectrum environments, it may not be possible for the base station to determine neighbor relations with base stations in different networks and/or base stations with different operators. Further, users in shared-spectrum environments may need to rapidly and frequently switch channels or adjust their transmit power levels to avoid causing harmful interference to primary users or to cope with increased congestion.

In accordance with some disclosed embodiments, the SAS can create and maintain a global NRT starting with single-network reports of individual base-station NRTs, which can also be referred to as local NRTs. The SAS can augment the single-network local NRT reports with additional neighbor relations across networks and operators, e.g., based on the SAS REM. Whenever a base station registers with the SAS or is directed by the SAS to switch channels, the SAS may provide that base station with a copy of the global NRT. The global NRT may then be used by the base station to immediately ensure smooth mobile user handovers between base stations and minimize dropped data and calls. The global NRT provided by the SAS gives the base station much more rapid and accurate knowledge of its neighbor relations, since the global NRT reduces the need for base-station measurements, base station-to-base station exchanges, and mobile-user reports, to create and maintain the contents of its local NRT. The SAS-provided global NRT may also contain details of neighbor relations outside the base station's local network, e.g., secondary network 406 in FIG. 4.

The SAS 410 may develop, maintain, and update a global NRT based on single-network reports of neighbor lists received from base stations in network 404 and in the secondary networks 406 and 412 and/or based on the contents of SAS's REM. The SAS may forward the global NRT to a base station upon the base station's registration/frequency reassignments in the shared spectrum system.

Figure 6:
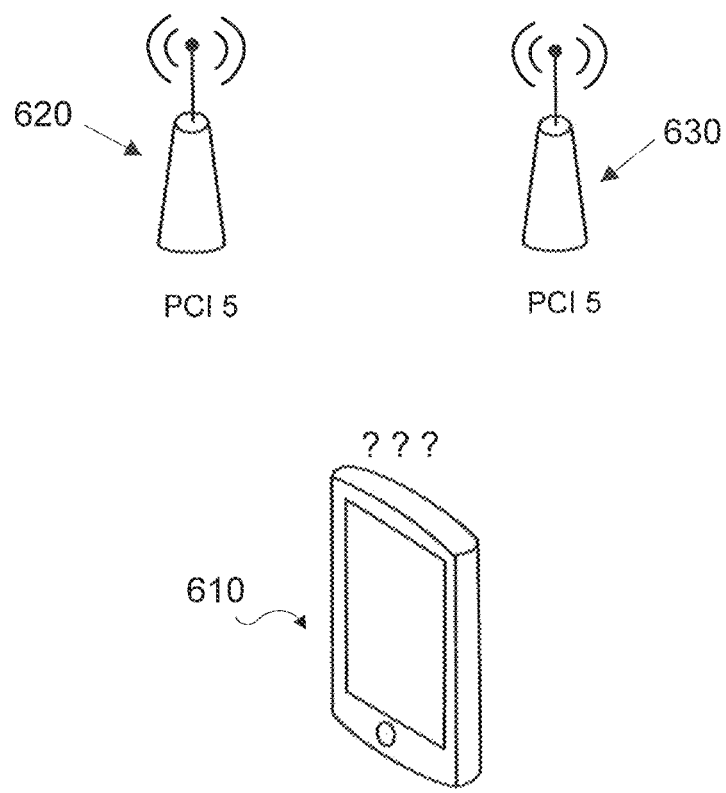
FIG. 6 is a schematic diagram of an exemplary user equipment in communication with multiple base stations that have been assigned the same PCI.

In other disclosed embodiments, the SAS 410 may manage the PCIs assigned to base stations in network 404 and in secondary networks 406 and 412, which also may promote more efficient quality of service (QoS), handover performance, cell coverage, and cell-edge throughput in the network. For example, LTE has 504 possible PCI values that may be assigned to base stations (eNodeBs). Proper PCI planning is useful for managing interference levels in LTE networks and reducing cell acquisition/synchronization times by user equipment. A proper PCI planning is, above all, collision free: No two co-channel neighboring base stations are allowed to have the same PCI. This is desired to avoid long cell-acquisition and synchronization times (as colliding PCIs create confusion among UEs) and high interference levels. FIG. 6 illustrates an exemplary collision that may arise if UE 610 receives the same PCI from adjacent base stations 620 and 630, i.e., neighboring base stations. In this scenario, the UE cannot rely on the PCI to distinguish between the base stations, e.g., in the event it needs to perform a handover to one of these base stations.

Figure 7:
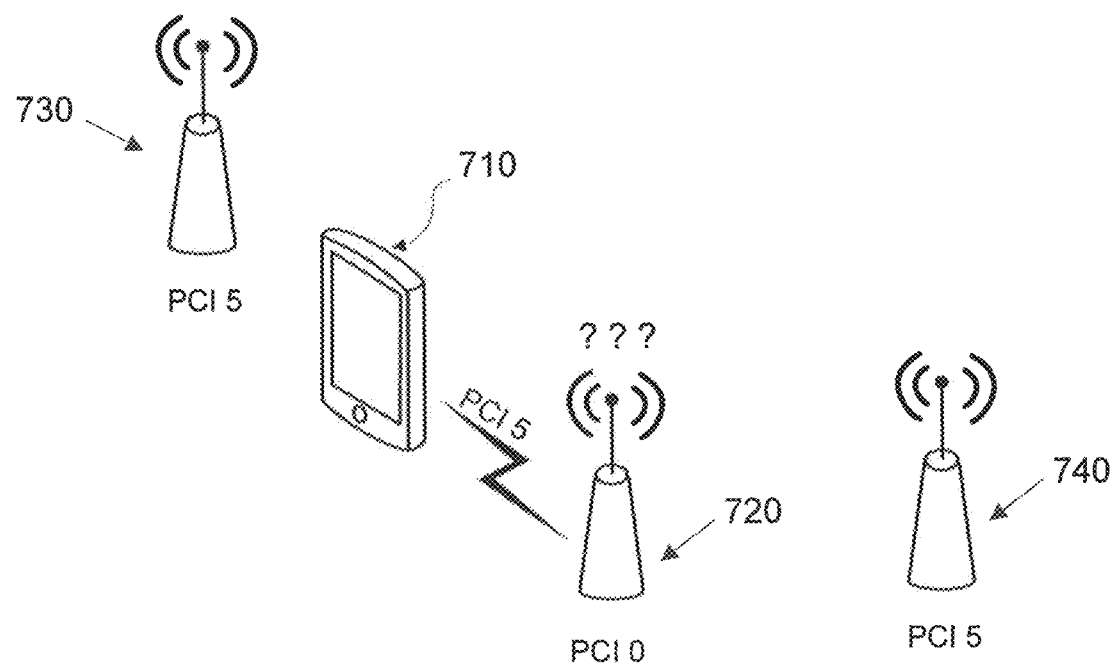
FIG. 7 is a schematic diagram of an exemplary base station that receives from a user equipment a PCI corresponding to multiple other base stations in the network.

A proper PCI planning is also confusion free: No two neighbors of a base station are allowed to have the same PCI if they are co-channel. Confusion-free PCI planning is crucial for the success of handover as there cannot be any ambiguity when a base station decides to handover a UE to one of its neighbors based on the PCI reported by the UE. For example, FIG. 7 illustrates confusion that may arise when UE 710 reports to its current base station 720 (PCI 0) that it should handover to an adjacent base station 730 with PCI 5, but there is another adjacent base station 740 also with PCI 5.

There are numerous other secondary constraints that one encounters when assigning PCIs to neighboring co-channel base stations. Here, for the sake of brevity, only three exemplary constraints are described that an SAS 410 may consider in accordance with the disclosed embodiments of the invention.

In some disclosed embodiments, when base stations are frame synchronized in a secondary network 406, co-channel neighboring base stations should not be assigned the same PCI values modulo 3, i.e., the neighboring base stations should not have PCI values that result in the same remainder when divided by three. This improves cell acquisition/synchronization speed. With the same PCIs modulo 3 ("PCI mod 3"), a UE receives the same Primary Synchronization Sequences (PSSs) from multiple base stations and, therefore, makes optimistic channel estimates. This, subsequently, reduces the UE's chance of successfully detecting the Secondary Synchronization Sequences (SSSs). Avoiding assignments of the same PCI values modulo 3 to neighboring base stations also reduces interference amongst Cell Specific Reference Signals (CSRSs) and Channel Quality Indicator (CQI) reports.

Figure 8:
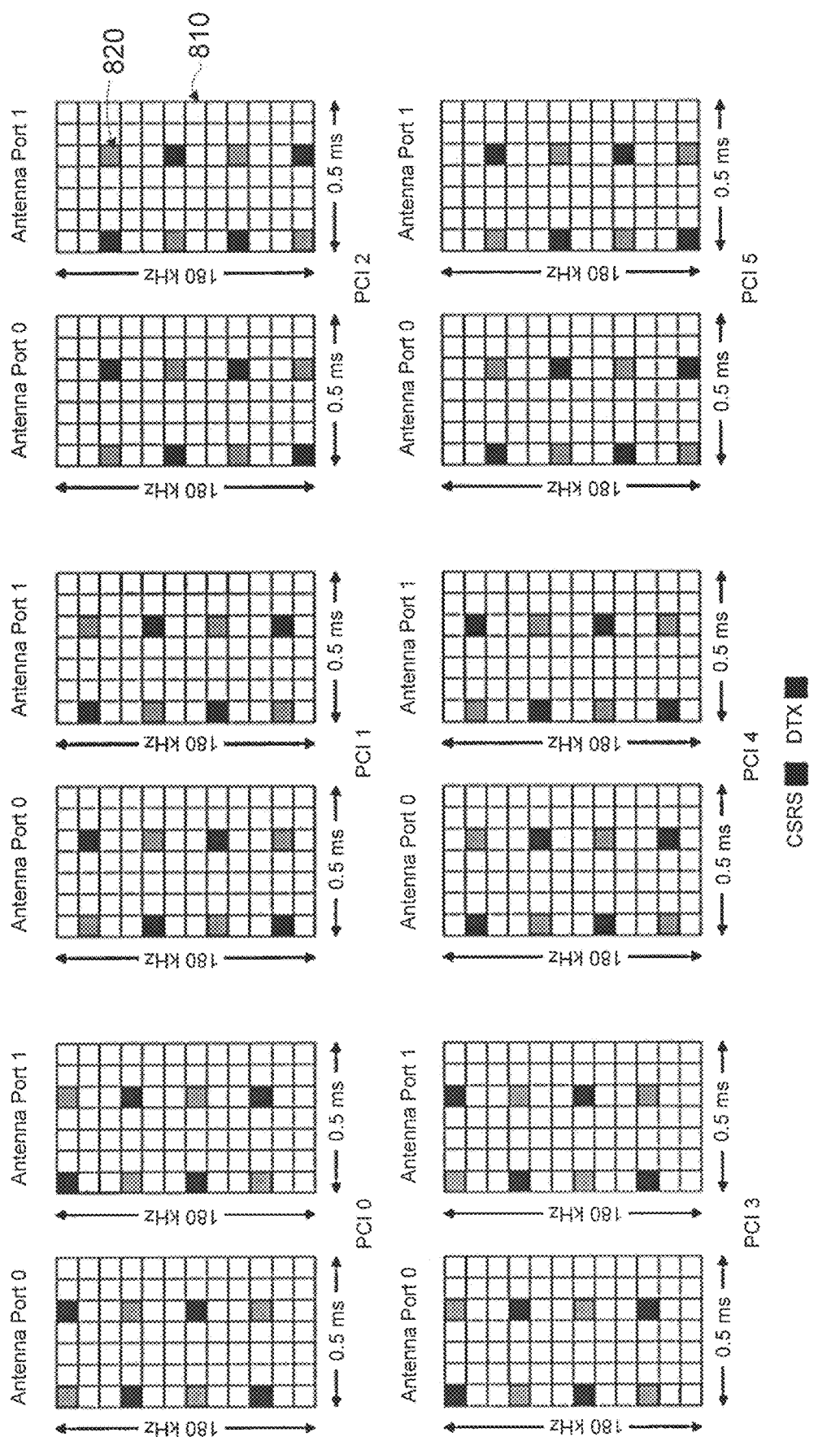
FIG. 8 is a schematic diagram of exemplary Resource Blocks showing time-frequency maps for multiple antennas at base stations assigned to different PCI values configured to communicate in an LTE network that may be used in accordance with at least some disclosed embodiments.

FIG. 8 illustrates exemplary Resource Blocks (RB) 810 that may be used by a base station having Antenna Ports 0 and 1. In this example, each RB contains Resource Elements (REs) 820 that may be occupied by CSRSs or discontinuous transmission periods (DTX). As can be seen, the locations of the CSRSs and DTXs in a time-frequency map is a function of the PCI value because the frequency subcarriers are cycled every 3 PCI values. With the same PCI mod 3, these subcarriers interfere with each other. This reduces the signal-to-noise ratio in general, and negatively affects CQI values in the network 404 and secondary networks 406 and 412.

Figure 9:
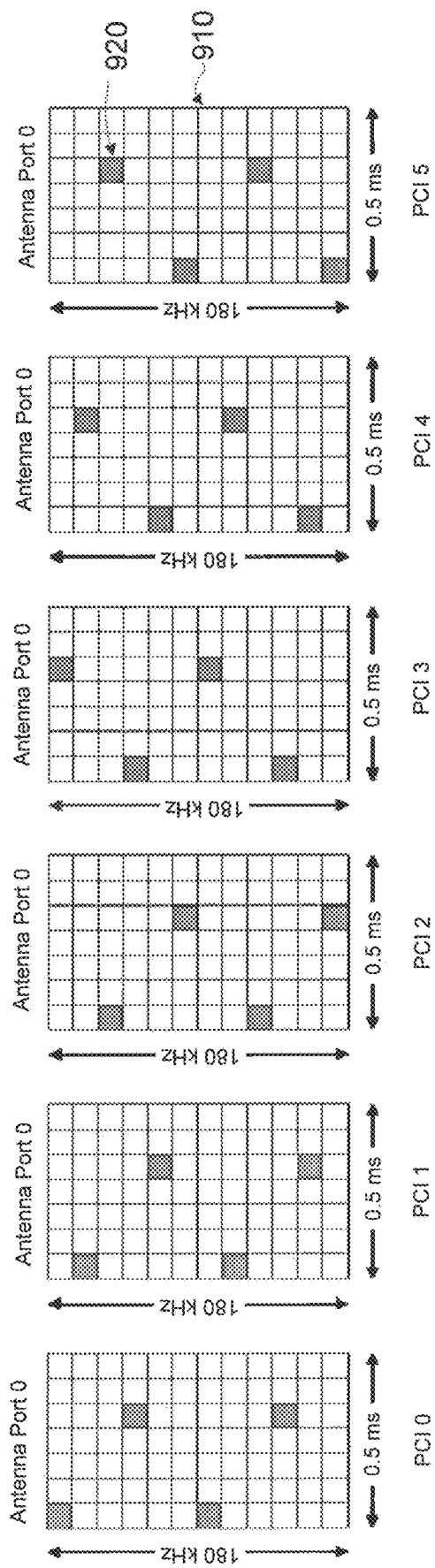
FIG. 9 is a schematic diagram of exemplary Resource Blocks showing time-frequency maps for a single antenna at base stations assigned to different PCI values configured to communicate in an LTE network that may be used in accordance with at least some disclosed embodiments.

Further, when base stations are frame synchronized and using single-antenna transmissions in network 404 or in secondary networks 406 or 412, co-channel neighboring base stations should not be assigned the same PCI values modulo 6 ("PCI mod 6") in accordance with other disclosed embodiments. Similar to the dual-antenna case in FIG. 8, avoiding the same PCI mod 6 for neighboring base stations reduces interference amongst CSRSs and CQI reports. FIG. 9 illustrates exemplary REs 920 occupied by CSRSs in a typical RB 910 for single-antenna transmission configurations. As can be seen, the location of CSRSs in the time-frequency map is a function of the PCI value because the frequency subcarriers used cycle every 6 PCIs. With the same PCI mod 6, these subcarriers interfere with each other and negatively affect the signal-to-noise ratio, in general, and CQI values, in particular, in the network 404 or in secondary networks 406 or 412.

In yet other disclosed embodiments, co-channel neighboring base stations should not be assigned the same PCI mod 30. Avoiding the same PCI mod 30 for neighboring base stations may reduce inter-cell interference by ensuring that neighbors use different Up-Link (UL) Reference Signal (RS) sequences.

To assist with PCI optimization, the SAS 410 may maintain a multi-vendor, multi-operator list of base station PCIs. The SAS can also unfold the global NRT to obtain a larger picture of the "neighborships" (e.g., neighbors, next-nearest neighbors, next-next-nearest neighbors, etc.) amongst the base stations in network 404 and in secondary networks 406 and 412. In this larger ("global") picture of the overall network topology, neighbors of neighbors are also known for each base station, although these important pieces of information would not ordinarily be available at the level of base stations. By combining the list of base-station PCIs and the unfolded global NRT, the SAS may solve the problem of hidden nodes, prevent PCI collision/confusion, satisfy various other secondary constraints, and efficiently use cell grouping/clustering techniques across vendors and operators in the network 404 and in secondary networks 406 and 412. The SAS may suggest an optimized set of candidate PCIs, preferably with rankings, that it sends to the base stations, for example, upon the base stations' registrations and/or channel assignments.

Moreover, in cases where due to the density of deployments, PCI confusion would become unavoidable, the SAS can create appropriate PCI black-lists (i.e., PCI values to avoid) for base stations to improve their handover performance and cell coverage. In these disclosed embodiments, the base stations should not attempt to handover to another neighboring base station with a black-listed PCI.

Similarly, during substantial network changes, the SAS 410 may be best positioned to come up with a PCI re-selection scheme that minimizes service disruptions. As discussed above, in some disclosed embodiments the SAS may leverage a multi-vendor, multiple-operator list of base station PCIs to suggest one or more PCI values, and may further rank candidate PCI values or identify black-listed PCI values, that it provides to a base station, for example, when the base station registers or is assigned/reassigned a frequency channel via the SAS.

In accordance with other disclosed embodiments, the SAS 410 may provide optimizations for a Random Access (RA) procedure by which a UE or other system attempts to initiate communications with a base station in any of the network 404 or in a secondary network 406 or 412. During the RA procedure, the UE transmits a base station-specific "signature" to the base station over a Random Access CHannel (RACH). In LTE, for example, there are 838 different possible RACH signatures available to all base stations. To reduce the UEs' cell-acquisition time, co-channel neighboring base stations should not have shared signatures. In the LTE standard, each base station is assigned 64 signatures and UEs can randomly select one of the base station's signatures. The UE knows how to generate the 64 signatures based on the base station's Root Sequence Index (RSI) and zeroCorrelationZoneConfig value. The first signature is a Zadoff-Chu sequence generated based on base station's RSI. The UE generates up to 63 more signatures by cyclic-shifting the first signature by intervals determined by the zeroCorrelationZoneConfig. Depending on the zeroCorrelationZoneConfig, however, the shift interval may be large. Thus, the UE may need more than one RSI value to generate all 64 of the base station's signatures. In general, the larger the base station's cell radius, the larger the shift interval, and, therefore, the larger the number of required RSI values. Proper RSI planning is desired to minimize signature collisions by different UEs attempting to communicate with the same base station and, ideally, have collision-free signature selections, which is not a trivial task.

Figure 10:
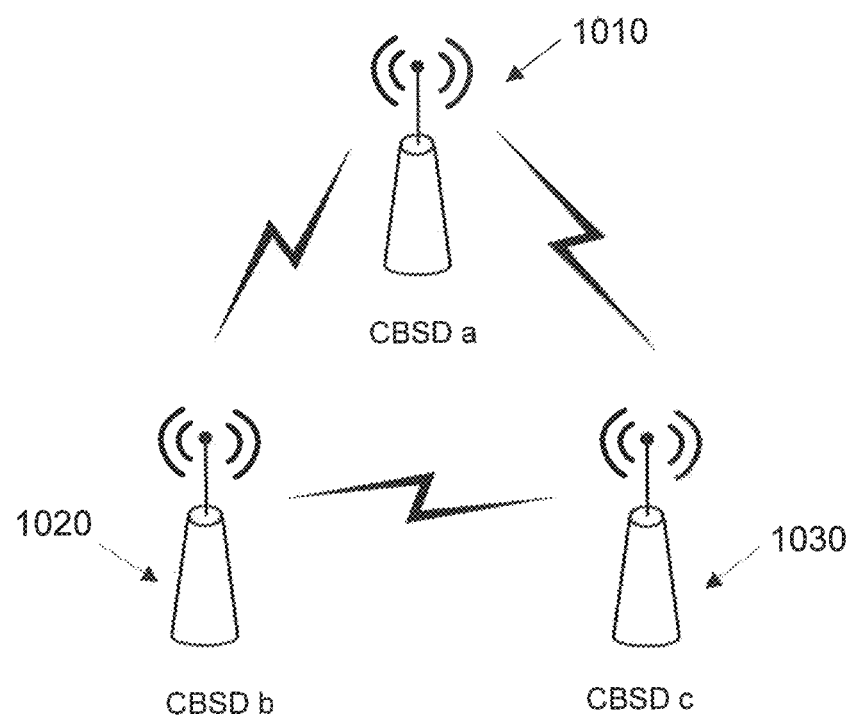
FIG. 10 is a schematic diagram of an exemplary set of base stations configured with different Root Sequence Index (RSI) and zeroCorrelationZoneConfig values in an LTE network that may be used in accordance with at least some disclosed embodiments.

FIG. 10 depicts three exemplary co-channel neighboring base stations, which in this example are Citizens Broadband radio Service Devices (CBSDs) for use in the 3.5 GHz spectrum. Base station 1010 ("CBSD a") has a zeroCorrelationZoneConfig equal to 12 while base stations 1020 and 1030 ("CBSD b" and "CBSD c") each have zeroCorrelationZoneConfig values equal to 11. A zeroCorrelationZoneConfig value of 12 corresponds to a shift interval of 119. As such, there are $\lfloor 839/119 \rfloor = 7$ signatures per RSI, and a UE needs $\lceil 64/7 \rceil = 10$ RSI to generate all 64 RACH signatures for the base station 1010. On the other hand, a zeroCorrelationZoneConfig value of 11 corresponds to a shift interval of 93, which translates into $\lfloor 839/93 \rfloor = 9$ signatures per RSI. In this example, the UE needs $\lceil 64/9 \rceil = 8$ RSI to generate all 64 signatures for base stations 1020 and 1030.

With a pool of possible RSIs ranging from 0 to 25, one can assign RSI 0 to base station 1010. This assignment, indirectly uses up RSIs 1 to 9 as well to account for the 10 RSIs that are needed to generate all 64 signatures of base station 1010. If one randomly selects another RSI from 11 to 25, say RSI 14 for base station 1020, then RSIs 15 to 21 are also indirectly used up to account for the 8 RSIs that are needed to generate all 64 signatures of base station 1020. But this selection is not a good one because the remaining RSIs in the pool are 10 to 13 and 22 to 25, and no matter which of these remaining RSI values is selected for base station 1030, there will always be overlap of signatures. One can easily see that a proper RSI planning assigns RSIs 0, 10, and 18 to base stations 1010, 1020, and 1030, respectively.

As can be seen, the nature of RSI planning is very similar to PCI planning. As such, to assist with RSI optimization, the SAS 410 may similarly maintain a multi-vendor, multi-operator list of base station RSIs and zeroCorrelationZoneConfig values. By combining this list and its global NRT, the SAS may prevent RSI collisions, minimize partial RSI collisions, and efficiently use cell grouping/clustering techniques across vendors and operators. In these disclosed embodiments, the SAS may suggest an optimized set of candidate RSI values, preferably with a suggested ranking of those RSI values, to provide to base stations, for example, upon their registrations and channel assignments.

Similar to the case of PCI planning, during substantial network changes, the SAS 410 may be best positioned to come up with an RSI re-selection scheme that minimizes service disruptions. Thus, the SAS may leverage a multi-vendor, multiple-operator list of base station RSIs to suggest an RSI, or list of ranked candidate RSI values, for example, when a base station registers or is assigned a channel via the SAS in accordance with some disclosed embodiments of the invention.

In yet other disclosed embodiments, the SAS 410 may provide other RACH optimizations in any of the network 404 or secondary networks 406 or 412. In these exemplary embodiments, the goals of RACH optimization are to achieve UL synchronization between a UE and base station, and obtain resources for network messages, such as a Radio Resource Control (RRC) Connection Request message. RACH optimization may be used in the following situations:

Initial access from the RRC Idle state
RRC Connection Re-establishment
Handover
Down-Link (DL) data arrival when the UL is "non-synchronized"
UL data arrival when UL is "non-synchronized"

In accordance with some disclosed embodiments, the SAS 410 may leverage reports from UEs across LTE operators to reduce RA procedure latency and interference by optimizing Physical Random Access Channel (PRACH) parameter settings. Single-operator networks do not have visibility and control across networks to perform such an optimization. Specifically, in LTE, base stations may request capable UEs to send certain RACH Reports to the base stations. Such a RACH Report may include the number of RACH signatures that the UE transmitted during its most-recent successfully completed RA procedure as well as a Boolean parameter indicating whether contention resolution was unsuccessful for at least one of the UE's transmitted signatures during the most-recent successfully completed RA procedure.

The SAS 410 may use these RACH Reports to optimize a PRACH configuration index, PRACH signature groupings, a PRACH back-off timer, and PRACH transmission power control parameters. The SAS's RACH optimizations may aim for adjusting the number of RA access attempts by UEs, improving RA access delays, reducing interference among RA access attempts, and/or improving UL interference. The SAS further may leverage one or more received UE RACH Reports across LTE operators to improve RACH performance by adjusting various RACH parameters.

The SAS 410 also may perform mobility load balancing and robustness optimization in accordance with some disclosed embodiments. For example, using the REM and global knowledge of base-station and mobile-user parameters and measurements, the SAS may suggest handover parameters, e.g., trigger thresholds and hysteresis parameters, for optimum mobility load balancing (MLB) and mobile robustness optimization (MRO). Optimized handover parameters can increase the overall capacity of the network 404 and secondary networks 406 and 412 by helping to avoid scenarios where a base station is congested with heavy user traffic while one or more of its neighboring base stations is relatively unloaded. The SAS also may suggest an antenna tilt, transmit power level, and inter-frequency handover thresholds based on optimization routines that can take into consideration the base-station backhaul capability. To assist with this optimization, the SAS can leverage handover and load-balancing measurements and other measurements including radio resource usage, Hardware (HW) and Transport Network Load (TNL) load indicators, MDT, RLF, and backhaul capability.

In some embodiments, the SAS 410 may detect a network failure and make network modifications necessary to compensate for the failure, for example, leveraging its global knowledge of the shared spectrum environment. In such situations, the SAS may adjust base station parameters, such as transmit power levels and antenna parameters including azimuth and downtilt. In these exemplary embodiments, the SAS may suggest to a base station experiencing a failure the availability of other shared spectrum channels that the base station could switch to for improved performance. The SAS also may help with detection and correction of hidden PCI confusion cases and keeping base station NRTs up-to-date by purging unused neighbor relations.

Figure 11:
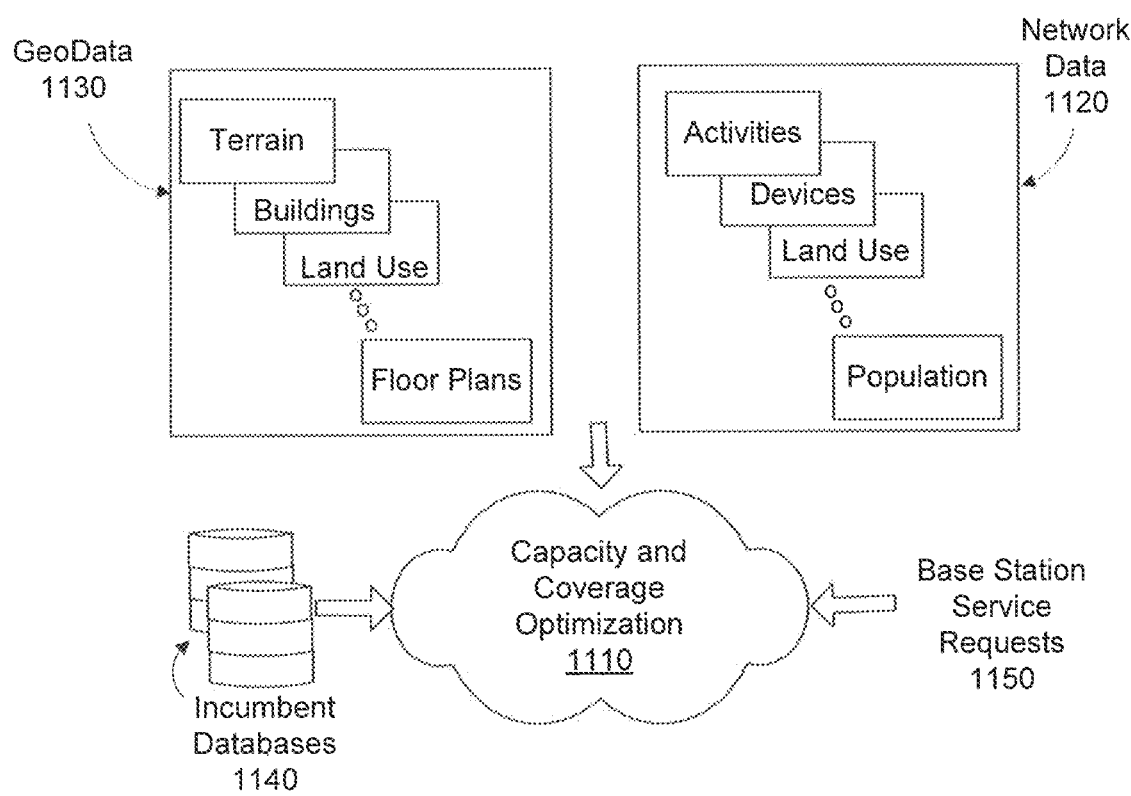
FIG. 11 is a schematic block diagram of exemplary data that may be processed by an SAS to perform certain network optimizations in accordance with at least some disclosed embodiments.

According to other disclosed embodiments, the SAS 410 may provide coverage and capacity optimizations in the network 404 and in secondary networks 406 and 412. Given its centralized location, the SAS can leverage its REM to cost-effectively and practically employ distributed processing and databases to perform coverage and capacity optimizations 1110, as illustrated in the exemplary schematic diagram in FIG. 11. These optimizations can leverage measurements from base stations and the mobile users that each base station supports. For example, the SAS's optimizations can leverage network data 1120 provided by each base station and/or determined via accessing databases, such as those providing population and geographical density of mobile users in an area of interest. The optimizations can also use geographic data 1130, such as for propagation modeling (e.g., floorplans, buildings, terrain, land category, clutter), and other information obtained from one or more incumbent databases 1140.

Using this data 1120, 1130, and 1140, and base station service requests 1150 (e.g., also shown in FIG. 11), the SAS 410 may perform an optimization to determine the base station channel and transmit power assignment. The SAS may take into consideration the REM it calculates based on measurements, base station parameters, and propagation modeling to perform this optimization. The SAS also may use measurements and machine learning to refine its REM to better estimate base station-to-base station interference, base station-to-mobile station, and mobile station-to-mobile station interference.

While the 3.5 GHz shared spectrum operation in the exemplary embodiments may support SAS-automated coverage and capacity optimization, those skilled in the art will recognize the described methods could be applied in other systems having shared frequency bands. The 3.5-GHz SAS is required to protect Priority Access License (PAL) base stations and mobile users from interference from lower-tier users, such as GAA base stations and their mobile users. In some embodiments, the aggregate interference from GAA users should be controlled to be less than or equal to −80 dBm/10 MHz in a PAL Protection Area (PPA) and on frequencies where the PAL users operate. The PPA surrounds PAL base stations and their mobile users.

The SAS 410 can use an objective function to optimally assign GAA users to frequency bands so they satisfy the PAL protection requirements and primary-user constraints, and further achieve any desired GAA coexistence optimization. For example, the objective function may be selected to minimize overall GAA-to-GAA interference (e.g., as determined using the REM) and maximize overall GAA bandwidth and coverage while satisfying PPA and primary-user constraints.

The objective function can also weigh the cost of switching frequencies in the GAA assignments and attempt to place base stations with different radio technologies (e.g., WiMAX, LTE) far apart in frequency so as to not degrade their measurement capabilities or cause interference due to misaligned TDD configurations and framing. All these considerations can be captured in the objective function used for GAA channel and power level assignments.

Figure 12:
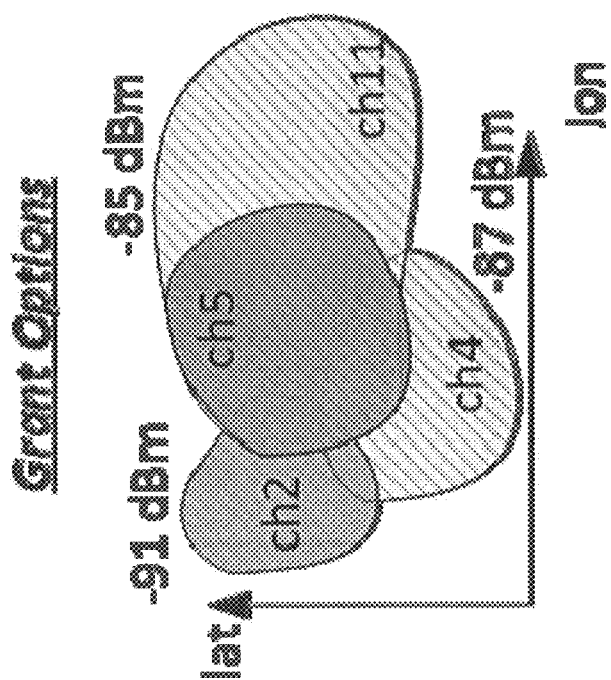
FIG. 12 is a schematic diagram of an exemplary latitude-longitude plot illustrating different geographic areas and signal strengths corresponding to available frequency channels that an SAS may provide as grant options to one or more base stations in accordance with at least some disclosed embodiments.

In those disclosed embodiments that use such an objective function, the SAS may indicate to each GAA user the aggregate interference that user would be permitted to generate over a certain geographical area and each of a range of channels. The GAA user may then select, from the SAS-provided candidates, an actual channel that it would like to operate on. For example, as illustrated in FIG. 12, the SAS may suggest that the GAA user consider as options operating on Channel 2, 4, 5, or 11. The GAA user would have to ensure that the aggregate interference from its users would be within −91 dBm on Channel 2 in an area defined by a latitude/longitude region or polygon (e.g., shown in the exemplary plot of "lat" and "long" in FIG. 12).

In one exemplary implementation, the SAS explicitly or implicitly partitions its interaction with base stations and the associated SON system in the following phases:

Initial Spectrum Grant and Configuration for a base station: On receiving a Grant Request from a base station, the SAS uses information provided from the base station or SON or Element Management System (EMS)/Network Management System (NMS) that includes, but is not limited to:
1. that particular base station's (eNodeB's) technical capabilities such as receiver technology, supported operation modes, timing capabilities;
2. REM measurements from the base stations;
3. REM information already available or provided by SON pertaining to surrounding base stations;
4. network loading conditions and patterns;
5. traffic related information; or
6. services that the base station needs to support.

The SAS uses this information to calculate and communicate to the base station the frequency, power, and operations configurations described in earlier sections.

Steady State operation: Based on periodic or trigger-based push or pull of different indicators of performance, such as measurements from systems in the SON or base stations or EMS/NMS, the SAS provides optimization guidance to the SON in terms of frequency, power, and operations configurations, as described in earlier sections. Such optimizations may be performed on a relatively longer-term time-scale and may be targeted to adapt to changing aspects of the networks, such as loading on the network, etc.

Conflict resolution: Every once in a while, based on performance metrics such as persistently high reported interference levels, throughput issues, RACH failures etc., the SAS may conclude that there is a conflict situation which is significantly impacting the performance of one or more base stations, and the SAS switches to a more urgent action in terms of configuration, frequency, and/or power recommendations. In such conflict situations, the SAS may iterate to get the affected base station or base stations working well again, but in those embodiments such iterations may be made more frequently compared to steady state optimizations.

In the event that such conflict resolution methods are not found to alleviate the performance degradation of one or more base stations, the SAS may decide to re-assign one or more CBSDs to a part of the spectrum that has been put aside for such scenarios, where the base stations that are treated such may be deemed deficient in receiver technology or other necessary technical capabilities such as timing, or may have been compromised. In such disclosed embodiments, this part of the spectrum is less managed in terms of performance primarily as a function of insufficient base station capabilities as deemed by the SAS.

Further to these illustrative disclosed embodiments, the SAS may also decide to use a guard band between the part of the spectrum where base station(s) with insufficient capabilities operate and the remaining spectrum where the more capable or healthy base stations operate and where there are better performance guarantees. The SAS may also support methods by which a base station that ends up in the part of the spectrum with lesser performance guarantees, provides, after some corrective actions, measurements or information that enables the SAS to decide that such a base station is ready to be re-allocated back to the part of the spectrum that has better performance guarantees.

Accordingly, in some disclosed embodiments of the invention, the SAS 410 may leverage its cross-network, cross-vendor, and cross-operator global REM and an objective function to assign secondary-user channel and transmit power levels. The objective function may include secondary-user interference, secondary-user bandwidth, secondary-user coverage, cost of switching channels, cost of secondary users with different radio technologies operating co-channel or on adjacent channels, or cost of misaligned TDD configurations and framing.

Figure 13:
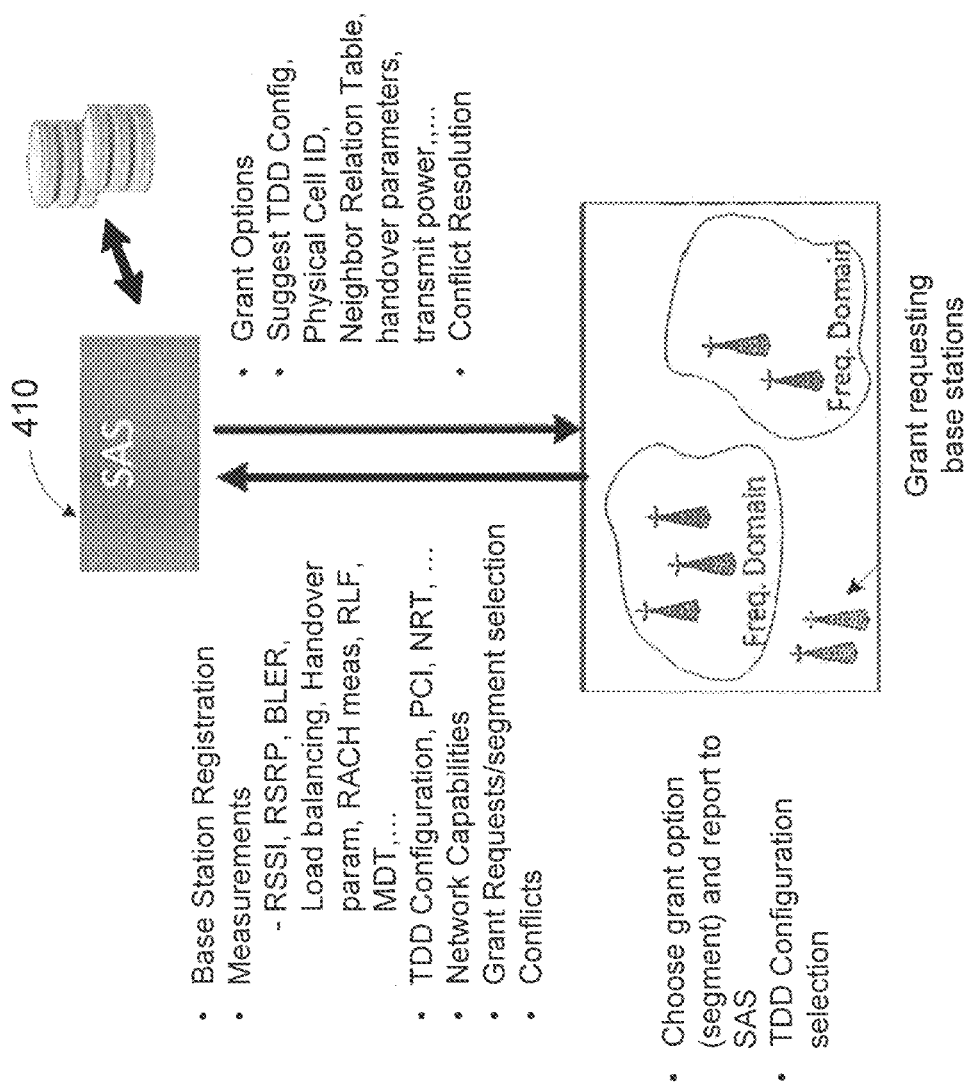
FIG. 13 is a schematic diagram of an exemplary set of information that may be exchanged between an SAS and base stations in accordance with at least some disclosed embodiments of the invention.

FIG. 13 illustrates an exemplary flow of information that may be exchanged between the SAS 410 and base stations in accordance with at least some of the disclosed embodiments herein. The SAS may send information including, but not limited to, one or more of channel-grant options, suggested TDD configurations, PCI, RSI, global NRT, handover parameters, transmit power levels, and conflict resolution information to at least one base station in network 404 or in any secondary network 406 or 412 in accordance with the disclosed embodiments. In some exemplary embodiments, the base stations may select a particular TDD configuration and/or choose a grant option (segment) to report to the SAS. The base stations may send information including, but not limited to, one or more of registration requests, measurements (e.g., Received Signal Strength Indicators (RSSI), Reference Signal Received Power (RSRP), Reference Signal Received Quality (RSRQ), bit or block error rates (BLER), load balancing measurements, handover parameters, RACH Reports, RLF information, MDT information, and other measurements), TDD configuration, PCI, and local NRT information, network capabilities, grant requests, segment selections, conflict information, or any other information in accordance with the disclosed embodiments described herein.

The exemplary SAS 410 described in the disclosed embodiments may be implemented in hardware, software, or any combination of hardware and software. A person of ordinary skill in the art will appreciate that the SAS may comprise any standalone or embedded general-purpose or special-purpose computer system that may be configured to operate consistent with the disclosed embodiments, and also may comprise one or more cloud-based services distributed over the network 404 and/or secondary networks 406 and 412. For example, the SAS may provide certain functions or services that are at least partially performed on a cloud platform (such as one or more remote servers) in communication with the SAS. By performing one or more of the optimizations for shared spectrum systems described above, the SAS 410 can provide SON services and functions for the network 404 and secondary networks 406 and 412 in the exemplary disclosed embodiments herein.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for optimizing time division duplexing (TDD) synchronization, comprising:
   identifying, by a Spectrum Access System (SAS), a first group of one or more networks and a second group of one or more networks, wherein the first group of one or more networks comprises a first set of base stations and the second group of one or more networks comprises a second set of base stations;
   determining, by the SAS, a first frame structure having one or more subframes associated with the first group of one or more networks;
   determining, by the SAS, a second frame structure having one or more subframes associated with the second group of one or more networks;
   determining, by the SAS, a number of mismatched subframes between the first and second frame structures; and
   separating, by the SAS, frequency channels assigned to the first group of one or more networks and the second group of one or more networks based on the number of mismatched subframes between the first and second frame structures.

2. The method of claim 1, wherein the first and second frame structures correspond to different TDD configurations.

3. The method of claim 1, wherein the same frequency channel is assigned to the first and second groups of networks if the number of mismatched subframes is less than a predetermined threshold value.

4. The method of claim 1, further comprising identifying the first group of one or more networks based on at least one of a Radio Environment Map, expected traffic demand, timing capability, or air interface technology associated with the first group of one or more networks.

5. The method of claim 1, further comprising identifying the second group of one or more networks based on at least one of a Radio Environment Map, expected traffic demand, timing capability, or air interface technology associated with the second group of one or more networks.

* * * * *